United States Patent [19]
Leidich

[11] 3,904,931
[45] Sept. 9, 1975

[54] OVERVOLTAGE PROTECTION CIRCUIT

[75] Inventor: Arthur John Leidich, Hunterdon, N.J.

[73] Assignee: RCA Corporation, New York, N.Y.

[22] Filed: Aug. 3, 1973

[21] Appl. No.: 385,301

[52] U.S. Cl. ................ 317/16; 317/31; 317/33 SC; 317/50; 357/38; 357/46; 357/86
[51] Int. Cl.² ...................... H02H 3/20; H02H 1/04
[58] Field of Search .......... 317/33 SC, 31, 33 R, 50, 317/33 VR, 235 AA, 235 AB, 235 T, 16, 50, 61.5; 307/252 G; 357/38, 46, 13, 48

[56] References Cited
UNITED STATES PATENTS

| | | | |
|---|---|---|---|
| 3,271,587 | 9/1966 | Schreiner | 317/235 AB |
| 3,303,360 | 2/1967 | Gentry | 317/235 AB |
| 3,407,335 | 10/1968 | Hartung | 317/33 SC |
| 3,475,653 | 10/1969 | Odenberg et al. | 317/16 |
| 3,573,550 | 4/1971 | Baker | 317/16 |
| 3,626,249 | 12/1971 | Snedeker | 317/31 |
| 3,638,042 | 1/1972 | Studtmann | 307/252 G |
| 3,699,406 | 10/1972 | Mapother et al. | 317/235 AB |

*Primary Examiner*—J. D. Miller
*Assistant Examiner*—Patrick R. Salce
*Attorney, Agent, or Firm*—H. Christoffersen; S. Cohen

[57] ABSTRACT

A silicon controlled rectifier (SCR) is connected at its cathode to one terminal of the device to be protected and at its anode to the other terminal of the device. When an overvoltage occurs, a zener diode connected between the trigger gate and anode of the SCR is driven into conduction in the zener mode and this causes anode-to-cathode conduction through the SCR, placing a low impedance path across the device to be protected. When the overvoltage is removed, the space-charge at the trigger electrode-bias electrode junction of the SCR is quickly dissipated, thereby opening the low impedance path.

2 Claims, 5 Drawing Figures

OVERVOLTAGE PROTECTION CIRCUIT

The present invention pertains generally to voltage protection circuits for the protection of an electronic device connected across a voltage source.

Devices such as those exemplified in U.S. Pat. No. 3,407,335 have been employed quite satisfactorily as overvoltage protection circuits to prevent damage to associated circuitry because of high voltage transients occurring at the circuit power terminals. However, certain drawbacks soon become apparent; for example, when used to protect an associated circuit having a high operating frequency and appropriate voltage, the time necessary for the device to return to its non-shunting mode after the current through the device becomes less than the minimum "holding current" necessary to sustain the device in its conduction state causes interference with the proper operation of the circuit to be protected.

Other types of overvoltage protection circuits such as that embodied in U.S. Pat. No. 3,626,249 impose an objectionable voltage across the circuit to be protected for the entire duration of the transient or overvoltage to be shunted.

While such protection devices as have been discussed have particular advantages in their respective arrangements, it is desirable to develop a device capable of turning on in response to a relatively short duration turn on signal, and having a decreased turn off time than heretofore possible, simplicity of operation and economy of manufacture.

When a semiconductor control rectifier (SCR), for example, is used in conjunction with a zener diode which is used to trigger or turn on the SCR, then, after the current through the SCR becomes less than the holding current and until the SCR reverts to its nonconducting state, an objectionably lengthy time for turn off of the device occurs. When a four layer SCR device is conducting in its low impedance conduction state, with a voltage negative at the cathode with respect to the anode, majority carriers are injected heavily into the regions on either side of the center junction. When current through the SCR is reduced to a magnitude less than the holding current, the time for the device to turn off is determined by the time necessary to reduce the number of these mobile charge carriers, a process that heretofore has been primarily dependent upon recombination of the majority carriers with their respective donors and acceptors. If, during the time before this high concentration of majority carriers has been sufficiently dissipated to allow the junction to regain its reversed bias configuration, a voltage is applied sufficient to cause a current through the device above the minimum holding level, the device will resume operation in the conduction state. This condition wherein current greater than the minimum holding current is caused to flow by a voltage applied to the SCR has dropped below the minimum holding current required but at a time before the device switches to its off state, can occur under normal circuit operation at frequencies in the order of 100 kilo hertz (kHz), thereby preventing resumption of proper operation of the circuit to be protected after the overvoltage has ceased.

In response to an overvoltage across a load, a switch is caused to conduct and a semiconductor junction connected across the switch and load becomes forward biased and conducts. The forward biased junction reduces the voltage across the switch to a level below that required to sustain conduction through the switch and the switch thereby opens. Means are provided for applying a reverse bias to the junction for rapidly reducing the concentration of majority carriers in the vicinity thereof, thereby hastening the return of the junction to the nonconducting condition when the overvoltage is removed.

Figure 1:
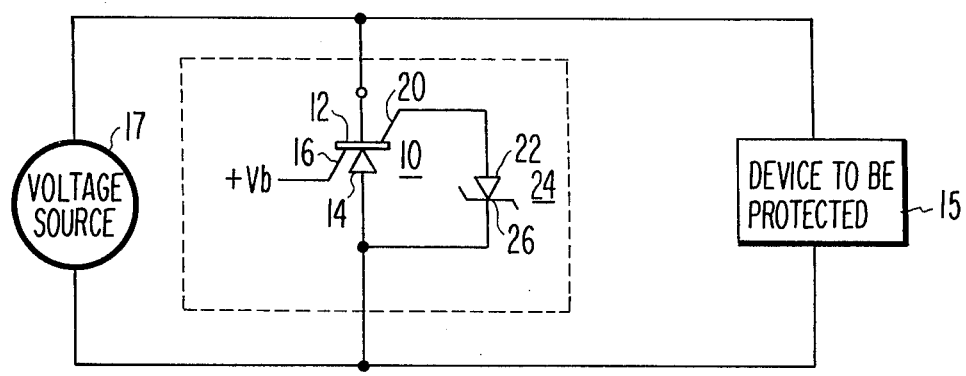
FIG. 1 is a block and circuit diagram of a preferred embodiment of this invention.
Figure 2:
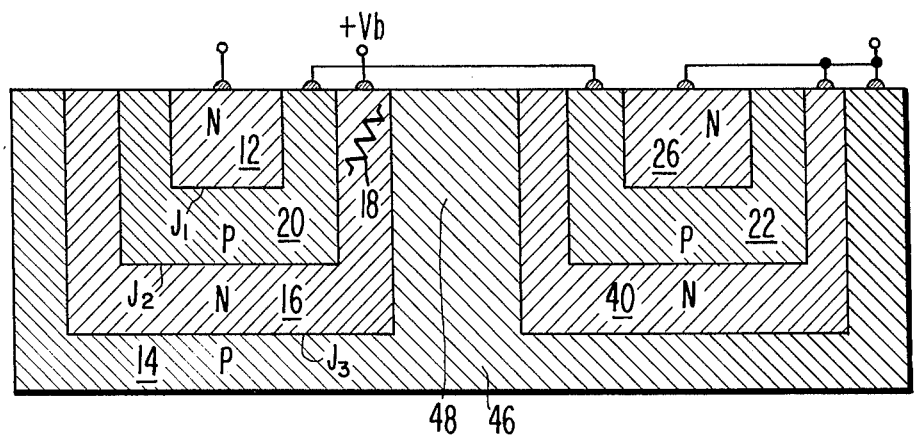
FIG. 2 is a cross sectional view of two of the devices shown in FIG. 1.
Figure 3:
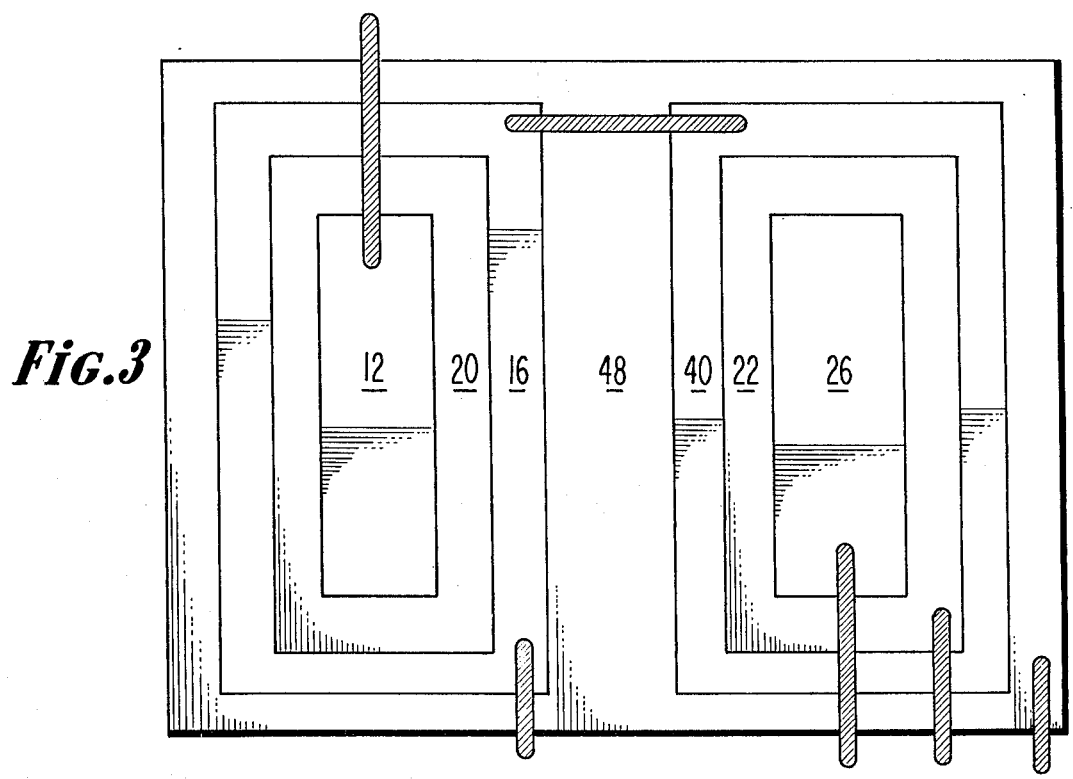
FIG. 3 is a plan view of the devices of FIG. 2.

FIGS. 1, 2 and 3, when taken together, illustrate a preferred embodiment of an overvoltage protection circuit according to the present invention.

The present invention is adapted to be used in connection with a voltage source and an electronic device to be protected from overvoltages appearing across it, generated, for example, by malfunction in the source. FIG. 1, which illustrates a preferred embodiment of the present invention, shows utilization of the invention to protect against only overvoltages of one polarity (i.e., only negative voltages) with respect to the device to be protected. By simply including a second protection circuit of this invention connected in a manner reverse to that of the first, protection of overvoltages of either polarity will be provided.

The preferred embodiment as shown in FIG. 1, includes a semiconductor control rectifier (SCR) 10, acting as an electronic switch, having a cathode 12, anode 14, bias gate 16 connected to a source of bias voltage $+V_b$ and a trigger gate 20. Zener diode 24 has its anode 22 connected to trigger gate 20 of SCR 10, and its cathode 26 connected to anode 14 of SCR 10. The device 15 to be protected and the source of (alternating) potential 17 are each connected across SCR 10.

Figure 4:
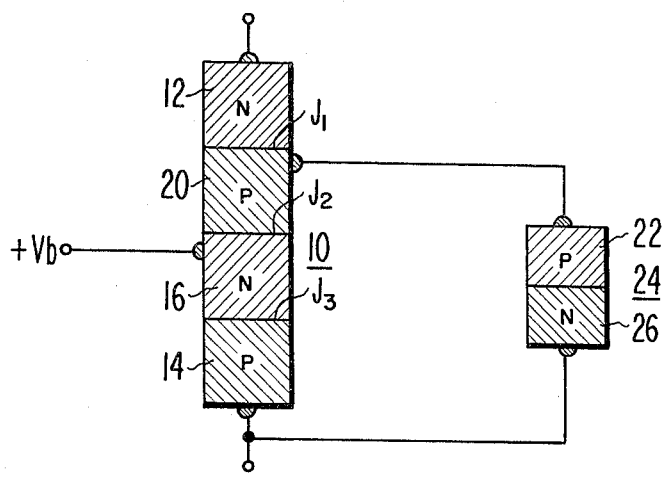
FIG. 4 is a diagrammatic representation of the devices of FIG. 2.

In the discussion which follows, FIGS. 1, 3 and 4 should be referred to. When a relatively negative voltage is present at SCR cathode 12 with respect to the voltage present at the anode 14, junction $J_2$ will tend to become reverse biased. Electrons in the n-type material 16 on one side of junction $J_2$ move toward the positively biased anode 14, leaving behind donor impurities stripped of electrons; in like manner, holes in the p-type material 20 move toward the cathode 12, leaving uncompensated acceptor impurities on the p-type material side of junction $J_2$. The donor impurities in the vicinity of $J_2$, having been deprived of their compensating electrons, become positively charged; whereas the acceptors stripped of holes are negatively charged. This results in the development of a space charge layer also known as a depletion region in the neighborhood of junction $J_2$ composed of donors and acceptors that are uncompensated by mobile charge carriers, and which creates a high electric field.

To change SCR 10 to its conducting state, space charge in the neighborhood of $J_2$ must be discharged. This discharge is accomplished by increasing the concentration of majority carriers adjacent to $J_2$. When gate current passes into junction gate 20, it supplies majority carriers to region 20, resulting in the initiation of the turn on of the device.

In operation, when an overvoltage is present at cathode 12 of SCR 10 (relatively negative at the cathode 12 with respect to the voltage at the anode 14), a voltage appears at the anode 22 of zener diode 24 which is smaller in magnitude than the overvoltage by the junction $J_1$ voltage drop. When the voltage at anode 22 of zener diode 24 exceeds the zener breakdown voltage, current flows from the source 17 through zener diode 24 and trigger gate 20, across junction $J_1$, and through cathode 12 back to source 17, thus supplying the gate current necessary to change the SCR to its conduction state.

As soon as SCR 10 begins conduction, junctions $J_2$ and $J_3$, across which the zener diode 24 is connected, become forward biased. The voltage drop across the total of these two junctions, when forward biased is a relatively small value—typically 0.3 volts or so. Thus, as soon as the zener diode switches into conduction, the voltage across the zener diode switches to this low value which is insufficient to sustain conduction through the diode in its reverse breakdown conduction state. In summary, in response to an overvoltage, zener diode 24 first conducts, then immediately cuts off. When it cuts off, SCR 10 is in conduction and zener diode 24 acts as a high impedance in parallel with a portion of the low impedance conducting SCR. The value of the parallel impedance is sufficiently high that it may be neglected.

When the SCR is in the conducting state, electrons and holes are heavily injected into the two gate regions 16 and 20, causing a high concentration of holes and electrons in the vicinity of $J_2$. In order to cause return of the SCR to the nonconducting state, the high concentration of holes and electrons that exist in the vicinity of $J_2$ must be reduced. When the current through the SCR is reduced to a magnitude less than the holding current, the mobile charge carriers will decrease through recombination in a manner which is largely independent of the external bias conditions. The time delay that elapses has been due to the time necessary for this recombination to occur, and has typically been of the order of 10 to 20 micro-seconds. This time delay is shortened in the present circuit by connection of a source of potential $+V_b$ to SCR bias gate 16. This facilitates the reduction of the high concentration of holes and electrons that exist in the p-type and n-type regions immediately adjacent to $J_2$. By the connection of this potential to bias gate 16, holes are introduced into n-type material 16 which combine with the free mobile electrons in that region; a similar recombination is caused in the p-type material and thereby reduction of the space charge in the neighborhood of junction $J_2$ is effectuated. The mechanism causing this relative increase in electron density is a well-known physical principle. Whatever change occurs in charge density on one side of a junction must occur to the oppositely charged density on the other side of the junction. This can be seen more practically by referring to FIG. 4. A current is flowing in the SCR device 10 which means physically that electrons are flowing into the cathode region 12, through regions 20 and 16 and out of the anode 14. The positive bias $V_b$ on region 16 removes electrons from region 16, thereby decreasing the electron density in this region (increasing the hole density). Since the electron density is higher in region 20 by an amount equal to the decrease (increase in holes) in region 16, the physics is satisfied. In this manner, the objectionable turn off time is reduced and a forward voltage may be reapplied, without the resumption of conduction by the SCR, in a shorter time than heretofore possible.

Alternatively, it can be considered that the potential applied to bias gate 16 creates a voltage gradient across the region 16 which acts to oppose the current through the device, thus effectively increasing the minimum holding current required to maintain the SCR in the conducting state.

Figure 5:
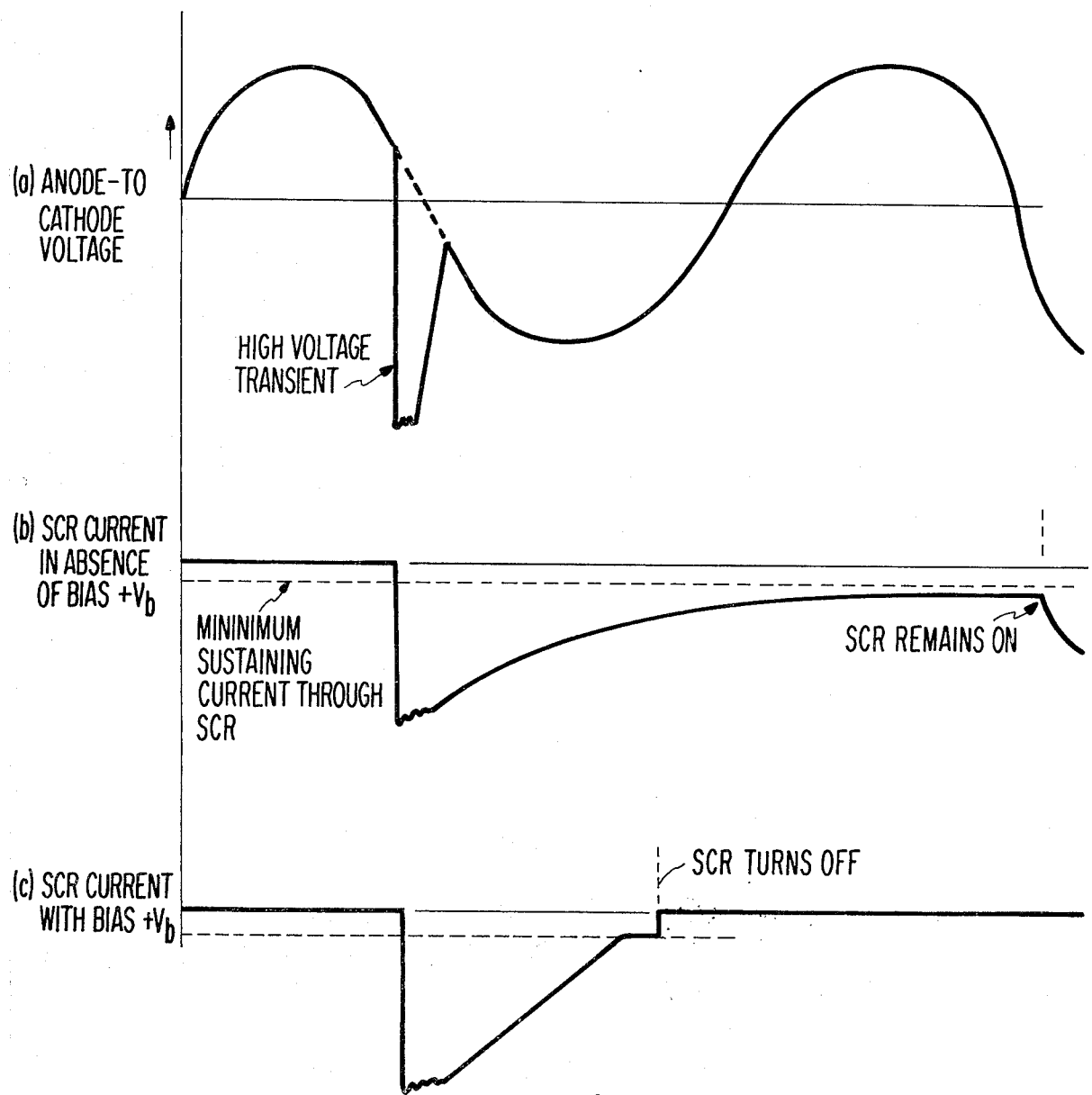
FIG. 5 is a drawing of waveforms to help explain the operation of the circuits of FIGS. 1–4.

The result of the effects above is illustrated graphically in FIG. 5. This figure shows at A the normal ac voltage applied across the SCR device and the high voltage transient which occasionally may occur. In the absence of the bias voltage $V_b$, the high voltage transient turns on the zener diode and the latter starts the SCR device conducting. The conduction continues through the SCR device for one complete period of the alternating voltage and the next negative half cycle causes the conduction to continue. In the circuit of the present application, the SCR device turns off within a relatively short interval of time. The injection of minority carriers into the n-type region 18 reduces the space charge in the manner already discussed resulting in quick turn off.

FIG. 2 shows a cross-sectional view of a typical integrated circuit implementation of the embodiment of FIG. 1. For the sake of simplicity in explaining the invention, overlying dielectric and conducting layers have been omitted from FIG. 2. (Also, the regions of the structure shown in FIG. 4 which correspond to the anodes, cathodes, trigger gate region, and bias gate region of the devices 10 and 24, are identically numbered.) P-type substrate 46 has n-type regions 40 and 16 epitaxially grown on its top surface.

(Techniques for growth of such an epitaxial region are well-known and thus will not be described in full detail in this specification.) Diffused in epitaxially grown regions 40 and 16 are regions 20 and 22 of p-type conductivity and within each of these regions respectively are n-type epitaxially grown regions 12 and 26. Zener diode 24 is a PN junction. Its anode 22 is formed by p-type region 22 while n-type region 26 serves as its cathode. The four layer SCR 10 is an NPNP type having its cathode formed by n region 12, its trigger gate 20 of p-type region 20, its bias gate 16 of n-type material 16, and with provision for the existence of resistor 18 within this layer (this resistive component necessarily and inherently present to some degree in actual devices of this nature so that a proper voltage gradient at, for example, the cathode 12-trigger gate 20 junction 60 can be maintained) connected to a source of reference potential.

Diffused p-type region 48 isolates the four layer device from adjacent active elements and similarly isolates the zener diode 24 from SCR 10. The SCR and zener diode are typically diffused in adjacent pockets. Contact between SCR 10 and zener diode 24 is made through conductive lead patterns deposited on and adhering to an overlying insulation. Such semiconductor insulated circuit techniques are described in, for example, U.S. Pat. No. 2,981,877, issued Apr. 25, 1961. Thus, while the circuit of the present invention is simple in construction and economical of manufacture, it provides an electrical shunt for harmful overvoltage currents while readily returning to normal non-shunting operation after cessation of the harmful overvoltage. In addition, due to the simplicity of the design of the circuit of the present invention, it is extremely reliable and is therefore useful in applications requiring protection over extended periods of constant use.

Therefore, there is provided in all of the illustrated embodiments an overvoltage protection circuit which is capable of rapidly shunting current of high voltage overloads and quickly and automatically resetting to its normal non-shunting state.

Inasmuch as the present invention is subject to many variations, modifications, and changes in detail, it is intended that all matter contained in the foregoing description or shown in the accompanying drawing shall be interpreted as illustrative and not in a limiting sense.

What is claimed is:

1. An alternating current overvoltage protection circuit, for protecting a load having two signal input terminals from a transient overvoltage component of a given polarity in excess of the normal peak amplitude of an alternating current signal supplied to said signal input terminals, comprising:

a reverse blocking tetrode thyristor having an anode terminal for connection to one of said load terminals and a cathode terminal for connection to the other of said load terminals, said thyristor also having a cathode gate terminal and an anode gate terminal;

a Zener diode connected at the anode and cathode terminals thereof, respectively, to the cathode gate terminal and the anode terminal of said thyristor; and means for continuously applying a direct current reverse bias signal of said given polarity to said anode gate terminal, whereby said thyristor is normally non-conductive for either polarity of said alternating current signal, is triggered into a conductive state by current supplied through said Zener diode to said cathode gate terminal in response to said transient overvoltage component of said given polarity and is rapidly returned to a non-conductive state in response to said reverse bias signal upon termination of said transient and reversal of said alternating current signal.

2. The overvoltage protection circuit set forth in claim 1 wherein said thyristor and said Zener diode are integrated upon a common semiconductor substrate.

* * * * *